(12) United States Patent
Ronen et al.

(10) Patent No.: US 8,874,882 B1
(45) Date of Patent: Oct. 28, 2014

(54) COMPILER-DIRECTED SIGN/ZERO EXTENSION OF A FIRST BIT SIZE RESULT TO OVERWRITE INCORRECT DATA BEFORE SUBSEQUENT PROCESSING INVOLVING THE RESULT WITHIN AN ARCHITECTURE SUPPORTING LARGER SECOND BIT SIZE VALUES

(75) Inventors: Ronny Ronen, Haifa (IL); Alexander Peleg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 981 days.

(21) Appl. No.: 09/539,436

(22) Filed: Mar. 30, 2000

(51) Int. Cl.
    *G06F 9/318* (2006.01)
    *G06F 9/302* (2006.01)
    *G06F 9/45* (2006.01)
    *G06F 9/30* (2006.01)

(52) U.S. Cl.
    CPC ............. *G06F 9/30181* (2013.01); *G06F 8/41* (2013.01); *G06F 9/3001* (2013.01)
    USPC ........................... 712/226; 712/221; 717/140

(58) Field of Classification Search
    CPC ...... G06F 8/41; G06F 9/3001; G06F 9/30181
    USPC ........... 712/210, 208, 220, 221, 226; 717/140
    See application file for complete search history.

(56) References Cited

U.S. PATENT DOCUMENTS

| 4,206,503 | A | * | 6/1980 | Woods et al. ................. 711/212 |
| 5,132,898 | A | * | 7/1992 | Sakamura et al. ............. 712/210 |
| 5,420,992 | A | * | 5/1995 | Killian et al. .................... 703/27 |
| 5,568,630 | A | * | 10/1996 | Killian et al. ................. 712/200 |
| 5,680,568 | A | * | 10/1997 | Sakamura ...................... 711/220 |
| 5,784,305 | A | * | 7/1998 | Nadehara ....................... 708/523 |
| 6,105,125 | A | * | 8/2000 | Nemirovsky et al. ......... 712/209 |
| 6,505,225 | B1 | * | 1/2003 | Takayanagi ................... 708/670 |

OTHER PUBLICATIONS

Heinrich, "Mips R4000 Microprocessor User's Manual, 2nd Edition," 1994, p. A-13.*
Heinrich, "MIPS R4000 Microprocessor Users Manual, 2nd Edition," 1994, p. A-14.*
Intel Architecture Software Developer's Manual, vol. 1, Basic Architecture, Instruction Set Summary, Chapter 6, pp. 6-1 through 6-45, 1999.

* cited by examiner

*Primary Examiner* — David J Huisman
(74) *Attorney, Agent, or Firm* — Kenyon & Kenyon LLP

(57) ABSTRACT

Apparatus and methods to add an extended first bit size data item of a first source operand specified by an instruction to a second source operand specified by the instruction. The first source operand and the second source operand are a second bit size, the second bit size being greater than the first bit size. The result of adding the extended data item of the first source operand to the second source operand can be stored.

22 Claims, 2 Drawing Sheets

300

Using a software compiler to analyze software code to port a first bit size application to an environment of a second bit size 302

↓

Choosing an instruction that performs zero/sign extensions when necessary 304

COMPILER-DIRECTED SIGN/ZERO EXTENSION OF A FIRST BIT SIZE RESULT TO OVERWRITE INCORRECT DATA BEFORE SUBSEQUENT PROCESSING INVOLVING THE RESULT WITHIN AN ARCHITECTURE SUPPORTING LARGER SECOND BIT SIZE VALUES

FIELD OF THE INVENTION

Embodiments of the present invention relate to a microprocessor. More particularly, embodiments of the present invention relate to execution of a ported 32-bit application on a microprocessor having a 64-bit architecture.

BACKGROUND OF THE INVENTION

Known 64-bit processors can execute 64-bit applications having 64-bit data types and 64-bit addressing. 32-bit applications typically have 32-bit data types and 32-bit addressing. Porting a 32-bit application into a 64-bit application can result in errors when dealing with 32-bit numbers in a 64-bit environment. Incorrect content (e.g., a carry value) can be introduced into the high order 32 bits of a 64-bit data item when 32-bit data is moved within general purpose registers. In view of the foregoing, it can be appreciated that a substantial need exists for methods and apparatus which can advantageously support execution of 32-bit applications on a 64-bit microprocessor.

DETAILED DESCRIPTION

According to embodiments of the present invention, a processor can execute instructions to support execution of ported 32-bit applications on a 64-bit microprocessor. Such instructions can result in correct results without performance degradation. In an embodiment, a processor can execute an add pointer instruction to sign/zero-extend a doubleword data item (i.e., 32-bit data item) of an operand and add the sign/zero-extended doubleword data item to a 64-bit pointer.

In an embodiment of the present invention, a 64-bit processor can execute a 32-bit application that has been ported into a 64-bit environment. The 64-bit processor can include support for instructions to compensate for incorrect content that can be introduced into the high-order 32 bits of a 64-bit data item when a 32-bit data item is moved and/or part of an operation within a general purpose register. One category of such errors relates to wraparound errors. 32-bit operations that wraparound in a 32-bit environment can, when executed in a 64-bit environment, cause the high-order 32 bits of a 64-bit data item to include a value other than 0 ("0" encompasses a value of 0) or 0° x.FFFF:FFFFH ("FFFFFFFFH" encompasses a hexadecimal value of FFFFFFFF). A wraparound error can be caused by, for example, propagation of a carry bit from the low-order 32 bits into the high-order 32 bits. A wraparound error can cause subsequent additional computation errors. Misinterpretation of an operand as a signed or unsigned number can fall under this category. For example, adding 0° xFFFFFFFFH to 0° x0000:0002 H results in 0° x0000:0001 H when the 32-bit operands are signed, but results in 0° x1:0000:0001 H when the 32-bit operands are unsigned. In a 32-bit environment, the result always wraps to 0x0000:0001 H.

Contamination of the high-order 32 bits of a 64-bit number may not be an issue when the computed result is to be stored in a 32-bit data item. When such contamination has occurred and the computed result is to be stored in a 64-bit data item, it can lead to additional errors that effect the results of a computation sequence. For example, an address error can occur. When the computed data item is used to address a data item in memory (e.g., in a 64-bit address space), the computation error can lead to a load or store from an incorrect address. A data error also can occur. When the computed data item is used as an operand to a certain operation (e.g., compare, divide, shift right, etc.), the content of the low-order 32 bits can be affected.

Figure 1:
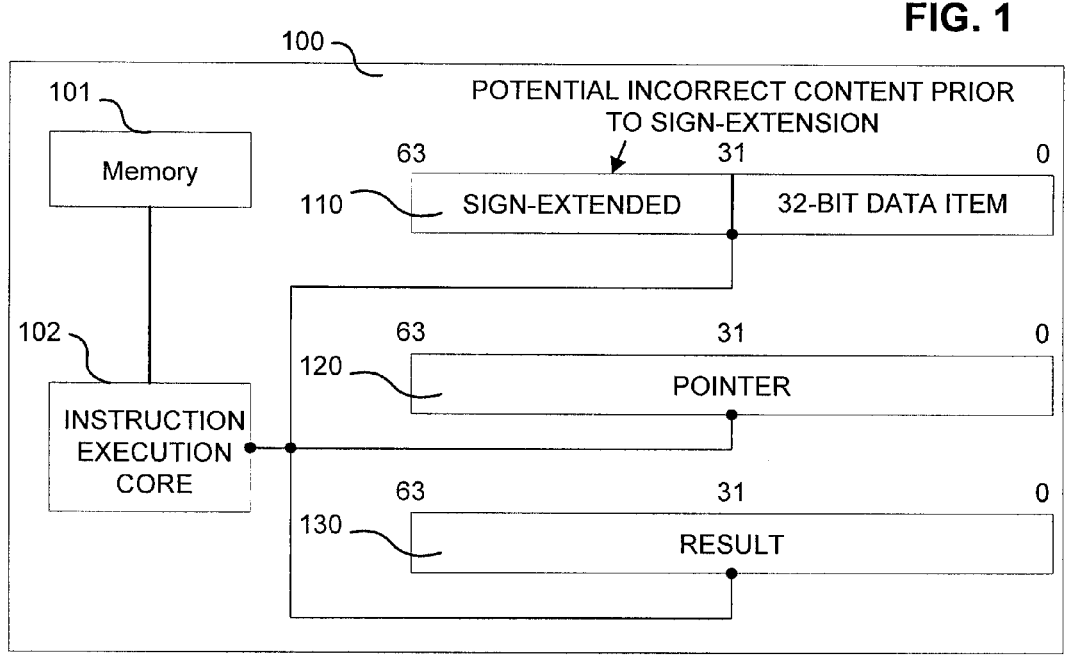
FIG. 1 is an illustration of an apparatus in accordance with an embodiment of the present invention.

FIG. 1 is an illustration of an apparatus in accordance with an embodiment of the present invention. In an embodiment, a 64-bit processor 100 can execute a 32-bit application that has been ported into a 64-bit environment. The 64-bit processor can execute at least one instruction to advantageously cope with problems that can arise from a wraparound error introduced into the most significant doubleword (i.e., the high-order 32 bits) of a 64-bit source operand including a 32-bit data item. Processor 100 can include a memory 101 coupled to an instruction execution core 102 coupled to a 64-bit general register 130. The term coupled encompasses a direct connection, an indirect connection, etc. Memory 101 (e.g., a cache, an instruction cache, volatile memory, non-volatile memory, etc.) can store a plurality of instructions of a 32-bit application ported to a 64-bit environment. The 64-bit general register 130, in an embodiment, has a least significant doubleword portion (e.g., bit locations 0 through 31) and a most significant doubleword portion (e.g., bit locations 32 through 63). In another embodiment, 64-bit general register 130 is a 64-bit portion of a register having at least 64 bit locations (e.g., a 96-bit general register, a 128-bit general register, a 256-bit general register, etc.). The instruction execution core 102, in an embodiment, can include an instruction fetch/decode unit, an execution unit, etc. In another embodiment, the instruction execution core 102 is an instruction execution core of a RISC (reduced instruction set computing) processor, a CISC (complex instruction set computing) processor, a VLIW (very long instruction word) processor, etc. The instruction execution core 102 can execute a first add doubleword instruction of the plurality of instructions.

The first add doubleword instruction can include a first source operand identifier and a second source operand identifier. The first source operand identifier can specify where a first 64-bit source operand including a 32-bit data item is stored (e.g., in a register, in a memory location identified at least in part on an address component stored in a register, etc.) The second source operand identifier can specify where a second 64-bit source operand is stored (e.g., in a register, in a memory location identified at least in part on an address component stored in a register, etc.) In an embodiment, the first source operand identifier can specify that the first 64-bit source operand including the 32-bit data item is stored in a 64-bit register 110, and the second source operand identifier can specify that the second 64-bit source operand is stored in 64-bit register 120. In a further embodiment, the second 64-bit source operand is a 64-bit pointer.

Execution of the first add doubleword instruction can generate an add result based on sign-extending the 32-bit data item of the first 64-bit source operand (e.g., copying the sign bit of the 32-bit data item to each of the bit positions of the high-order 32 bits of the first 64-bit source operand, etc.) being stored in register 110, and adding the modified first 64-bit source operand (i.e., the sign-extended, at—least 32-bit data item) to the second 64-bit source operand. In an embodiment, the first add doubleword instruction is an integer add doubleword to pointer instruction.

In an embodiment, prior to execution of the first add doubleword instruction, the 64-bit register 110 can be storing the 32-bit data item in the low-order 32 bits (i.e., bits 0 to 31) and a high-order $32^{nd}$ bit value in the high-order 32 bits (i.e., bits 32 to 63). The higher order $32^{nd}$ bit value stored in the high-order 32 bits of 64-bit register 110 can be based at least in part on a wraparound error of a prior interim operation (e.g., add, subtract, etc). In one embodiment, the 32-bit data item can be the result of an interim computation of a 32-bit offset in a 64-bit environment, where a 64-bit register storing the 32-bit offset can include wrong content in its high-order 32 bits (e.g., a least significant doubleword of the register includes the 32-bit offset and the most significant doubleword of the register includes incorrect content due to a wraparound).

When the add result of the first add doubleword operation is a 64-bit value, the instruction execution core 102 can store the add result in 64-bit general register 130. When the add result includes more than 64 bits, the lowest 64 bits of the add result can be stored in 64-bit general register 130. In one embodiment, when the add result includes more than 64 bits, the add result can be truncated and the lowest 64 bits of the add result can be stored in 64-bit general register 130. The first add doubleword instruction, in one embodiment, can allow a calculated 32-bit displacement (e.g., a first source operand) to be properly added to a 64-bit pointer.

Figure 2:
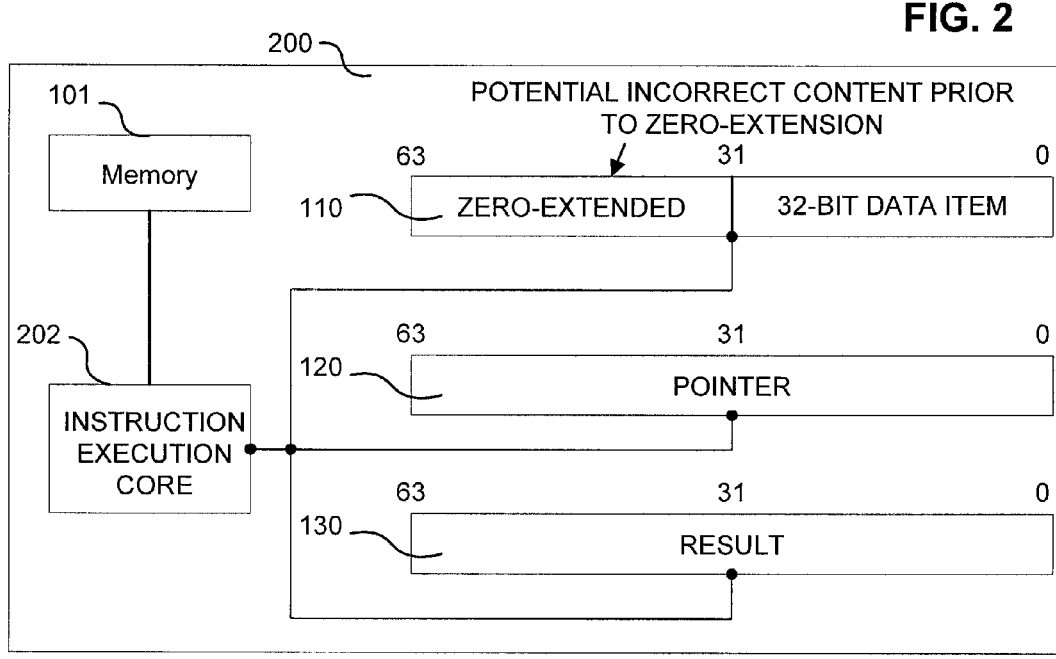
FIG. 2 is an illustration of an apparatus in accordance with an embodiment of the present invention.

FIG. 2 is an illustration of an apparatus in accordance with an embodiment of the present invention. A 64-bit processor 200 can execute a 32-bit application that has been ported into a 64-bit environment. Instruction execution core 202 can execute a second add doubleword instruction. The second add doubleword instruction can generate a result based on an add of a 64-bit source operand stored in 64-bit general register 120 to a zero-extended 32-bit data item stored in 64-bit general register 110. Zero-extending can encompass writing a zero value to each of the bit positions of the high-order 32 bits of a first 64-bit source operand. In one embodiment, the second add doubleword instruction is an integer add doubleword to pointer instruction. When the add result is a 64-bit value, the instruction execution core 102 can store the add result in 64-bit general register 130. The second add doubleword instruction, in one embodiment, can allow a calculated 32-bit displacement (e.g., a data item of a first source operand) to be properly added to a 64-bit pointer.

In a further embodiment of the present invention, first bit size application can be ported to a second bit size environment, where the second bit size is greater than the first bit size. A second bit size processor can execute the ported first bit size application. An instruction execution core of the second bit size processor can execute an instruction to add (1) a first source operand of the second bit size, the first source operand including a first bit size data item, and (2) a second source operand of the second bit size. The first source operand can include incorrect content in its high-order bits due to a prior computational error that yielded the first bit size data item (e.g., include a wraparound error). The instruction can generate an add result based on modifying the first source operand by sign/zero extending the first bit size data item, and adding the modified first source operand to the second source operand.

Methods and apparatus in accordance with embodiments of the present invention can advantageously support execution of 32-bit applications ported to a 64-bit environment. Execution of an instruction in accordance with an embodiment of the present invention can compensate for incorrect content (e.g., a wraparound error) that can be introduced into the high-order 32 bits of a 64-bit data item when a 32-bit data item is moved and/or part of an instruction operation. A known method of addressing such incorrect content can zero/sign extend each data value before it is used, but system performance is degraded. Software compilers can lessen such degradation of system performance by analyzing the code of the ported application and choosing an instruction that performs such zero/sign extension operations when necessary. Embodiments of the present invention can compensate for incorrect content without significant performance degradation. A software compiler can analyze the code to have the necessary zero/sign extensions performed as part of the described instructions, thus the software need not include additional 10 instructions to fix data values having incorrect content.

Figure 3:
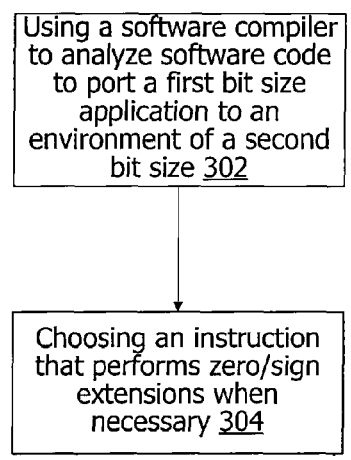
FIG. 3 is an illustration of a flowchart in accordance with an embodiment of the present invention.

FIG. 3 is an illustration of a flowchart in accordance with an embodiment of the present invention. As shown in FIG. 3, at step 302, a method 300 may use a software compiler to analyze software code to port a first bit size application to an environment of a second bit size. In one embodiment, the second bit size may be greater than the first bit size. Then at step 304, the method 300 may choose an instruction that performs zero/sign extensions when necessary.

In the foregoing detailed description, apparatus and methods in accordance with embodiments of the present invention have been described with reference to specific exemplary embodiments. Accordingly, the present specification and figures are to be regarded as illustrative rather than restrictive.

We claim:

1. A method comprising:
    determining, by a compiler, that a first instruction operation will potentially introduce an error during runtime in a full size processing environment to a first source operand having a first bit size content;
    in response to the compiler determining that the first instruction operation will potentially introduce the error during runtime in the full size processing environment to the first source operand having the first bit size content, configuring by the compiler, a second instruction to extend, during runtime, the first bit size content of the first source operand to a full size of the first source operand, wherein the full size of the first source operand is a second bit size that is larger than the first bit size; and
    in response to a processor receiving the second instruction for execution:
        extending, during runtime, by the processor, the first bit size content of the first source operand to the full size of the first source operand to generate an extended first source operand; and
        adding, by the processor, the extended first source operand to a second source operand, wherein the second source operand has the second bit size.

2. The method of claim 1, wherein extending the first bit size content of the first source operand to the full size of the first source operand comprises sign-extending.

3. The method of claim 1, wherein extending the first bit size content of the first source operand to the full size of the first source operand comprises zero-extending.

4. The method of claim 1, wherein the first bit size content of the first source operand is a 32-bit data item of a first 64-bit source operand, the second source operand is a 64-bit pointer, and a result of said adding is a 64-bit result.

5. The method according to claim 1, wherein the first bit size content occupies lower order bit positions of the first source operand before the extending.

6. The method of claim 1, wherein the method is caused to be performed to port and execute a plurality of instructions of a software application of the first bit size in the processing environment of the second bit size.

7. A system comprising:
a hardware core to execute a plurality of instructions; and
a compiler to determine that a first instruction operation will potentially introduce an error during runtime in a full size processing environment to a first source operand having a first bit size content;
wherein in response to the compiler determining that the first instruction operation will potentially introduce the error during runtime in the full size processing environment to the first source operand having the first bit size content, the compiler configures a second instruction to extend, during runtime, the first bit size content of the first source operand to a full size of the first source operand, wherein the full size of the first source operand is a second bit size that is larger than the first bit size; and
wherein in response to the hardware core receiving the second instruction for execution:
the hardware core extends, during runtime, the first bit size content of the first source operand to the full size of the first source operand to generate an extended first source operand; and
the hardware core adds, during runtime, the extended first source operand to a second source operand, wherein the second source operand has the second bit size.

8. The system of claim 7, further comprising:
storage with the second bit size to store an interim result of the first instruction operation as the first source operand, the storage having a first portion of the first bit size to store an instruction operational result comprising the first bit size content and a second portion to store an incorrect content, wherein the incorrect content is replaced during the extending and prior to the adding, wherein the hardware core performs the first instruction operation on a data item of the first bit size.

9. The system of claim 8, wherein the extending comprises zero-extending.

10. The system of claim 8, wherein the extending is comprises sign-extending.

11. The system of claim 8, wherein the first bit size is 32-bit and the second bit size is 64-bit.

12. The system of claim 7, wherein the second source operand is a 64-bit pointer.

13. A system comprising:
a compiler for determining, that a first instruction operation will potentially introduce an error during runtime in a full size processing environment to a first source operand having a first bit size content,
wherein in response to the determining that the first instruction operation will potentially introduce the error during runtime in the full size processing environment to the first source operand having the first bit size content, the compiler configures a second instruction to extend, during runtime, the first bit size content of the first source operand to a full size of the first source operand, wherein the full size of the first source operand is a second bit size that is larger than the first bit size;
a memory to store a plurality of instructions; and
an instruction execution core coupled to said memory, said instruction execution core to execute the plurality of instructions,
wherein in response to the instruction execution core receiving the second instruction for execution:
the instruction execution core extends, during runtime, the first bit size content of the first source operand to the full size of the first source operand to generate an extended first source operand; and
the instruction execution core adds, during runtime, the extended first source operand to a second source operand, wherein the second source operand has the second bit size.

14. The system of claim 13, wherein the plurality of instructions are for porting and executing a first bit size application in a second bit size environment.

15. The system of claim 13, wherein the extending comprises sign-extending.

16. The system of claim 13, wherein the extending is comprises zero-extending.

17. The system of claim 13, wherein the first bit size is 32-bit and the second bit size is 64-bit.

18. The system of claim 13, wherein the memory is a cache memory.

19. The system of claim 13, wherein the second source operand is a 64-bit pointer.

20. The system of claim 13, wherein the first bit size content is a 32-bit integer data item and the second source operand is a 64-bit integer source operand.

21. The system of claim 13, wherein the first bit size content is stored in lower order bit positions of a register of the second bit size.

22. A method comprising:
determining, by a compiler, that a first instruction operation will potentially introduce a wraparound error during runtime in a full size processing environment to a first source operand having a first bit size content;
in response to the compiler determining that the first instruction operation will potentially introduce the wraparound error during runtime in the full size processing environment to the first source operand having the first bit size content, configuring by the compiler, a second instruction to extend, during runtime, the first bit size content of the first source operand to a full size of the first source operand, wherein the full size of the first source operand is a second bit size that is larger than the first bit size; and
in response to a processor receiving the second instruction for execution:
extending, during runtime, by the processor, the first bit size content of the first source operand to the full size of the first source operand to generate an extended first source operand; and
adding, by the processor, the extended first source operand to a second source operand, wherein the second source operand has the second bit size.

* * * * *